United States Patent [19]

Smith et al.

[11] 4,343,984
[45] Aug. 10, 1982

[54] GAS-SHIELDED FLUX-CORED WIRE ELECTRODES FOR HIGH IMPACT WELDMENTS

[75] Inventors: Ronald B. Smith, Jefferson; Edward J. Galda, Ashtabula; Masahiro Nakabayashi, Jefferson, all of Ohio

[73] Assignee: Union Carbide Corporation, Danbury, Conn.

[21] Appl. No.: 897,825

[22] Filed: Apr. 19, 1978

[51] Int. Cl.$^3$ .............................................. B23K 35/30
[52] U.S. Cl. .............................. 219/146.3; 219/145.22; 219/146.41
[58] Field of Search .................. 219/145.22, 146.23, 219/146.3, 146.41; 148/24

[56] References Cited

U.S. PATENT DOCUMENTS

| | | | |
|---|---|---|---|
| 3,415,976 | 12/1968 | Smith | 219/146.23 X |
| 3,418,446 | 12/1968 | Claussen | 219/145.22 X |
| 3,424,892 | 1/1969 | Wilcox | 219/146.23 X |
| 3,778,587 | 12/1973 | Kubli | 219/146 |
| 3,778,589 | 12/1973 | Nakabayashi | 219/146 |
| 3,818,178 | 6/1974 | Nakabayashi | 219/146 |
| 4,021,637 | 5/1977 | DeHaeck | 219/146 |

*Primary Examiner*—Richard R. Kucia
*Attorney, Agent, or Firm*—E. Lieberstein

[57] ABSTRACT

A cored wire electrode for use with a shielding gas, particularly in out-of-position welding, said electrode having a core material containing rutile, an arc stabilizer, deoxidizers including from about 5 to 15 weight percent of a manganese and silicon-containing compound, from about 1 to about 7 weight percent of magnesium and/or magnesium-aluminum alloys, from about 3 to about 10 weight percent manganese oxide, from about 5 to 20 weight percent nickel, from about 2 to 15 weight percent silica, and from about 0.5 to 5.0 weight percent $Al_2O_3$-$SiO_2$-$K_2O$.

4 Claims, No Drawings

GAS-SHIELDED FLUX-CORED WIRE ELECTRODES FOR HIGH IMPACT WELDMENTS

The present invention relates to consumable electrodes for electric arc welding and more particularly to rutile based flux-cored wire electrodes for arc welding with a shielding medium especially a carbon dioxide or carbon dioxide-containing shielding gas.

Flux-cored wire electrodes have gained wide acceptance in recent years for use in out-of-position welding operations. These electrodes exhibit deposition rates which are significantly higher than those attainable with other types of electrodes. Moreover, the flux composition can be formulated in accordance with known techniques to produce a highly viscous molten slag which will solidify or "quick freeze" in a short period of time. A viscous slag is of course necessary in order to help hold the rather large base of molten metal in the vertical or "overhead" position.

U.S. Pat. No. 3,818,178 to Nakabayashi et al discloses a flux-cored wire electrode which satisfies the foregoing requirements for use in out-of-position welding operations. This electrode comprises a hollow sheath of mild steel having a flux core which contains conventional flux materials such as rutile, deoxidizers, e.g. ferromanganese and ferromanganese silicon, arc stabilizers, and iron powder, together with elemental magnesium or magnesium-aluminum alloy in an amount of from about 1 to 7 weight percent of the core material. It has been found that the addition of magnesium or magnesium-aluminum alloy to the conventional flux material produces a slag which stiffens or becomes highly viscous well above the melting point of both the slag and the steel.

Although the above-described electrodes have proven satisfactory in conventional out-of-position welding operations, they unfortunately do not produce a weld metal of sufficiently high toughness to meet the requirements of some modern day applications. These applications include, for example, off-shore drill rigs, arctic construction and naval ships.

It is well known that the addition of nickel to the flux formulation usually as a replacement for iron powder, in whole or in part, greatly increases the toughness of the resultant weld metal. Since nickel is fairly non-reactive, it does not form any slagging ingredient and hence the viscosity of the slag will remain unaffected. In addition, nickel is also known to improve the low temperature impact properties of the weld metal. However, the problem that arises when nickel is added to the flux formulation is that the presence of nickel also substantially increases the tensile strength of the weld metal. In actual practice, the tensile strength may be substantially increased by the addition of nickel to the point where there is a real danger of weld cracking.

It has also been found that the occurrence of excessive tensile strength in the weld metal can be effectively controlled by reducing the manganese and silicon content in the mix formulation. In actual practice, the reduction of the manganese and silicon content has proved successful in this regard but it has also been found that the silicon, which must be used in combination with the manganese to attain the desired deoxidizing effect, has a profound influence on the behavior of the slag system. In the present case, the reduced level of silicon content in the flux formulation decreases the slag viscosity to the point where it is very difficult, if not impossible, to maintain control over the molten weld pool.

It has been discovered in accordance with the present invention that an improved flux-cored wire electrode for use particularly in out-of-position welding with a shielding medium, e.g., carbon dioxide gas, can be manufactured having a high nickel content for added toughness in the weld metal and low manganese and silicon content for substantially reducing the tensile strength of the weld metal but without substantially lowering the viscosity of the slag if silica ($SiO_2$) is added to the flux. The silica is added in amounts of from about 2 to 15% and preferably between about 3 and 6% by weight of the flux formulation. Below about 2% by weight, it has been found that the silica has no discernible effect on the viscosity of the slag. It has also been found that the presence of silica in amounts above about 15% by weight tend to substantially increase the viscosity of the slag and consequently slag entrapment can occur. In addition to the nickel, silica and conventional flux additives, e.g. rutile, deoxidizers, sodium or potassium compounds and optionally iron powder, the flux formulation will also contain elemental magnesium or magnesium-aluminum alloy in amounts which will provide the necessary high viscosity to the slag, i.e. about 1 to about 7 weight percent, together with about 3 to about 10 weight percent manganese oxide. The manganese oxide has a beneficially quieting effect on the arc.

The deoxidizers that may be used are any of the conventional deoxidizers and are usually taken from the class of deoxidizers consisting of ferromanganese silicon; ferromanganese; ferrosilicon; zirconium silicon; calcium silicon; ferroaluminum silicon; alkali metals and alkaline earth metals. Ferromanganese silicon and ferromanganese are preferred. Any of the above deoxidizers may be used, provided some silicon is present from one of the ingredients used. Suitably, the deoxidizer mixture contains about 70 percent manganese and about 30 percent silicon.

Heretofore, the deoxidizer has been used in amounts of from about 10 to about 30 weight percent of the flux formulation. However, in the practice of the present invention the manganese and silicon content is reduced in the flux formulation in order to maintain the tensile strength of the weld metal within an acceptable limit. Thus the ferromanganese-silicon is reduced to an amount between about 5 and 15 and preferably between 10 and 13 weight percent of the flux. Suitably, the silicon content should be maintained in the range of between about 1.5 and 4.5 weight percent.

Iron powder may be used as an arc stabilizer and may be present in amounts of from about 0.0 to about 40 weight percent. The amount of iron powder is dependent on the core weight percent used. For example, if a very small core is used, it means that more steel sheath is used. Accordingly, less iron powder is needed in the core because the iron is being supplied by the sheath. As noted above, the iron powder may be replaced entirely by the addition of nickel. Suitably, the nickel is added in amounts of from about 5 to about 20 weight percent and preferably between about 9 and 18 weight percent.

A sodium or potassium-containing compound such as sodium fluoride or potassium silicate may be used to aid in stabilizing the arc, and may be present in the range of from about 0.5 to about 8 weight percent. Calcium fluoride has been found to have an adverse effect on the ability of the electrode of this invention to weld out-of-position.

Rutile ($TiO_2$) is the basis of the flux and is the slag forming ingredient. Rutile should be present in an amount of from about 30 to 60 weight percent of the core. If much more than about 60 weight percent rutile is used, the slag will become too fluid and the beneficial effect of magnesium or magnesium aluminum alloy will be lost. $Al_2O_3$-$SiO_2$-$K_2O$ can be used as a slag forming aid and is present in a range of from about 0.5 to 5.0 weight percent.

It also has been found that alumina $Al_2O_3$ should be used when the magnesium is added by an alloy of magnesium-alumina. Alumina aids in producing the stiff slag when magnesium-aluminum is used. The amount of alumina should be between about 0.5 and 5 weight percent.

A typical flux formulation (14% by weight core) is represented by the following:

| Flux Ingredients | % by Weight |
|---|---|
| Fe | 0–40 |
| $TiO_2$ | 30–60 |
| Fe—Mn—Si | 5–15 |
| MnO | 3–10 |
| NaF | 0.5–8.0 |
| Al—Mg | 1.0–7.0 |
| $Al_2O_3$—$SiO_2$—$K_2O$ | 0.5–5.0 |
| Ni | 5–20 |
| $SiO_2$ | 2–15 |

The preferred core ratio has been found to be about 10 to about 20 weight percent of the total electrode. It should be obvious to those skilled in the art that as the core ratio changes the weight percent of the ingredients of the core will of necessity have to change. The following examples are given by way of illustration of the various core percentages in the compositions thereof, but it should be understood that minor modifications may be made thereto especially with respect to percentages of materials used based on the core percentage without departing from the spirit and scope of the present invention.

EXAMPLE I

A 1/16 inch diameter 14 core weight percent electrode was made with a mild steel sheath. The flux composition was formulated in accordance with the teachings of Nakabayashi et al, U.S. Pat. No. 3,818,178, and included the following ingredients in the appropriate weight percents given: $Al_2O_3$ 2.6%; MnO 6.4%; NaF 2.6%; $Na_2SiO_3$ 2.6%; $TiO_2$ 44.95%; Al-Mg (50-50) 5.15%; Fe Powder 16.40%; and Fe-Mn-Si 19.30%. This electrode was used to make vertical upwelds at about 220 amps and 22 volts. $CO_2$ was used as the shielding gas in this and the following examples. The properties of the weld were as follows: UTS-89,220 psi and CVN-12 ft.-lbs. at $-40°$ F. Operability of this electrode was excellent and the tensile level was acceptable. However, for certain special applications (off-shore drill rigs, arctic construction, etc.), the impact properties of the weld at low temperatures were considered unacceptable.

EXAMPLE II

A 1/16 inch diameter 14 core weight percent electrode was made with a mild steel sheath. The flux in this electrode contained nickel in place of iron powder along with the following ingredients in the approximate weight percent given: Fe 0.0%; $TiO_2$ 43.5%; Fe-Mn-Si 19.3%; MnO 6.4%; NaF 2.6%; Al-Mg 5.1%; $Na_2SiO_3$ 2.6%; $Al_2O_3$ 2.6% and Ni 17.9%. This electrode was also used to make vertical upwelds at about 220 amps and 22 volts. The properties of the weld were as follows: UTS-115,700 psi; YS-97,300 psi; % EL-23.0; % RA-59.6; and CVN at $-60°$ F. 27 ft.-lbs. An analysis of the weld composition yielded the following: C 0.07%; Mn 1.48%; Si 0.80%; and Ni 3.09%. Operability of this electrode was again excellent and the toughness of the weld at low temperature was improved over the above example. However, the high tensile strength was considered unacceptable.

EXAMPLE III

In this example, three 1/16 inch diameter 14 core weight percent electrodes were made and contained varying amounts of both iron powder and nickel. The weight percent of both manganese and silicon (Fe-Mn-Si) was reduced in all three electrodes from the amount used in the two above examples. The flux compositions for the three electrodes were as follows:

|  | (1) | (2) | (3) |
|---|---|---|---|
| Fe | 13.6 | 10.1 | 7.1 |
| $TiO_2$ | 45.0 | 45.0 | 45.0 |
| Fe—Mn—Si | 13.0 | 13.0 | 13.0 |
| MnO | 6.4 | 6.4 | 6.4 |
| NaF | 2.6 | 2.6 | 2.6 |
| Al—Mg | 5.2 | 5.2 | 5.2 |
| $Na_2SiO_3$ | 2.6 | 2.6 | 2.6 |
| $Al_2O_3$ | 2.6 | 2.6 | 2.6 |
| Ni | 9.0 | 12.5 | 15.5 |

The three electrodes were also used to make the same vertical upwelds at about 220 amps and 22 volts. The properties of the welds from the three electrodes were as follows:

| Properties: | (1) | (2) | (3) |
|---|---|---|---|
| UTS (psi) | 83,460 | 87,870 | 88,020 |
| YS (psi) | 74,940 | 79,630 | 79,810 |
| % EL | 25.0 | 24.0 | 25.0 |
| % RA | 65.8 | 54.7 | 68.1 |
| CVN a $-60°$ F. (ft.-lbs.) | 34 | 31 | 32 |

An analysis of the weld yielded the following results:

|  | (1) | (2) | (3) |
|---|---|---|---|
| C | .04% | .04% | .05% |
| Mn | .92% | .94% | 1.00% |
| Si | .38% | .40% | .38% |
| Ni | 1.28% | 1.90% | 2.45% |

The toughness of the welds made from the three electrodes with varying nickel levels was considered to be good and the tensile levels were acceptable. However, the operability of the three electrodes was only poor to fair mainly because the weld puddle was too fluid and consequently hard to control.

EXAMPLE IV

In this example two 1/16 inch diameter 14 core weight percent electrodes were made. The two electrodes contained nickel in place of iron powder, a lower level of ferromaganese silicon and had as additives both silica and Feldspar. The flux compositions for the two electrodes are given as follows:

|  | (1) | (2) |
| --- | --- | --- |
| Al₂O₃ | 2.1 | 2.1 |
| MnO | 6.4 | 6.4 |
| NaF | 2.6 | 2.6 |
| TiO₂ | 43.7 | 42.5 |
| Al—Mg (50—50) | 5.2 | 5.2 |
| Fe Powder | 8.8 | 7.0 |
| Fe—Mn—Si | 10.1 | 10.1 |
| SiO₂ | 3.0 | 6.0 |
| Al₂O₃—SiO₂—K₂O | 2.6 | 2.6 |
| Ni | 15.5 | 15.5 |

The two electrodes were also used to make the same vertical upwelds under the same conditions as in the previous examples. The properties of the welds were as follows: UTS-85,210 psi and CVN-32 ft.-lbs. at −60° F. for both electrodes. Operability of these two electrodes was considered to be acceptable and the slag freezing characteristics were excellent.

EXAMPLE V

In the following example, two 1/16 inch diameter 14 core weight percent electrodes were made with different weight percents Al₂O₃-SiO₂-K₂O.

|  | (1) | (2) |
| --- | --- | --- |
| Al₂O₃ | 2.6 | 2.6 |
| MnO | 6.4 | 6.4 |
| NaF | 2.6 | 2.6 |
| Na₂O—SiO₂ | 2.6 | 2.6 |
| TiO₂ | 45.0 | 45.0 |
| AL—Mg | 5.2 | 5.2 |
| Fe | 7.5 | 5.0 |
| Fe—Mn—Si | 10.1 | 10.1 |
| Ni | 15.5 | 15.5 |
| Al₂O₃—SiO₂—K₂O | 2.5 | 5.0 |

Electrode (1) performed quite well in operability. However, Electrode (2) had a globular arc with low viscosity slag, which required more skill to produce a better weld head.

What is claimed is:

1. In a consumable wire electrode for out of position gas shielded electric arc welding comprising a hollow sheath of mild steel and a flux core comprising essentially from about 10 to about 20 weight percent of the total electrode, said core material containing rutile, a sodium or potassium bearing arc stabilizer; a metal of from about 1 to about 7 weight percent of said core material taken from the class consisting of magnesium and magnesium-aluminum alloys, from about 3 to 10 weight percent of said core material of manganese oxide, wherein the improvement comprises said core material containing from 5 to about 20 weight percent nickel and from about 5 to 15% by weight ferromanganese-silicon.

2. A consumable wire electrode for gas shielded electric arc welding comprising a hollow sheath of mild steel and a flux core comprising essentially from about 10 to about 20 weight percent of the total electrode, said flux core containing from about 5 to 15 weight percent of at least one deoxidizer taken from the class consisting of ferromanganese-silicon, ferromanganese, ferrosilicon, zirconium-silicon, calcium-silicon, ferroaluminum-silicon, alkali metals and alkalin earth metals with the proviso that some silicon be present; from about 0 to about 40 weight percent iron powder; from about 0.5 to about 8 weight percent of at least one arc stabilizer taken from the class of arc stabilizers consisting of sodium and potassium bearing compounds; about 30 to 60 weight rutile; about 1 to about 7 weight percent of at least one of the metals taken from the class consisting of magnesium and magnesium-aluminum alloys; about 3 to 10 weight percent manganese oxide; about 0.5 to 5.0 percent by weight alumina when magnesium-aluminum alloy is used; from about 5 to about 20 weight percent of nickel and about 2 to 15 weight percent of silica, and from about 0.5 to 5 weight percent of Al₂O₃-SiO₂-K₂O.

3. A consumable wire electrode as defined by claim 2 wherein nickel is present in a range of from about 9 to about 18 weight percent, silica is present in a range of from about 3 to about 6 weight percent and ferromanganese-silicon is present in a range of from about 10 to about 13 weight percent.

4. A consumable wire electrode for gas shielded electric arc welding comprising a hollow sheath of mild shield and a metal flux core comprising essentially from about 10 to about 20 weight percent of the total electrode, said flux core containing about 2.1 weight percent Al₂O₃; about 6.4 weight percent MnO; about 2.6 weight percent NaF; about 42 to 44 weight percent TiO₂; about 5.2 weight percent Al-Mg wherein the mixture of Al and Mg is about 50-50 percent; about 7 to 9 weight percent Fe Powder; about 10.1 percent by weight Fe-Mn-Si; about 3 to 6 weight percent SiO₂; about 2.6 percent Al₂O₃-SiO₂-K₂O; and about 15.5 percent Ni.

* * * * *